United States Patent
Jeong et al.

(10) Patent No.: US 7,920,834 B2
(45) Date of Patent: Apr. 5, 2011

(54) APPARATUS AND METHOD FOR SELECTING ANTENNAS AND NODES MIMO COMMUNICATION SYSTEM

(75) Inventors: Wun Cheol Jeong, Cheongju (KR); Nae Soo Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 850 days.

(21) Appl. No.: 11/736,798

(22) Filed: Apr. 18, 2007

(65) Prior Publication Data

US 2008/0081570 A1  Apr. 3, 2008

(30) Foreign Application Priority Data

Sep. 29, 2006 (KR) .......................... 10-2006-0096415

(51) Int. Cl.
*H04B 1/02* (2006.01)
(52) U.S. Cl. ...................... 455/101; 455/67.11; 455/130; 455/277.1
(58) Field of Classification Search .................. 455/101, 455/67.11, 130, 136, 168.1, 226.1, 296, 278.1, 455/114.2, 562.1, 277.1–277.2
See application file for complete search history.

(56) References Cited

U.S. PATENT DOCUMENTS

| | | | |
|---|---|---|---|
| 5,887,247 A * | 3/1999 | Baltus et al. | 455/78 |
| 6,714,584 B1 * | 3/2004 | Ishii et al. | 375/347 |
| 7,499,510 B2 * | 3/2009 | Wee et al. | 375/347 |
| 7,515,939 B2 * | 4/2009 | Catreux-Erceg et al. | 455/562.1 |
| 7,715,879 B2 * | 5/2010 | Nakao | 455/562.1 |
| 7,840,235 B2 * | 11/2010 | Catreux-Erceg et al. | 455/277.2 |
| 2008/0013638 A1 * | 1/2008 | Walton et al. | 375/260 |
| 2010/0087151 A1 * | 4/2010 | Auer | 455/67.11 |

FOREIGN PATENT DOCUMENTS

| | | |
|---|---|---|
| KR | 1020050037210 | 4/2005 |
| KR | 10-2006-0051773 | 5/2006 |

OTHER PUBLICATIONS

Korean Notice of Patent Grant dated Dec. 12, 2007 for the corresponding KR 10-2006-0096415.

* cited by examiner

*Primary Examiner* — Lana N Le
(74) *Attorney, Agent, or Firm* — Ladas & Parry LLP

(57) ABSTRACT

An apparatus and method for selecting antennas and nodes in a multi-input multi-output (MIMO) communication system are provided. The apparatus includes a reception unit which detects a communication initiation signal from among a plurality of received signals, a first combination unit which calculates communication capacity based on the communication initiation signal, searches for a combination of transmission antennas that can maximize the communication capacity, and performs communication using the identified combination of transmission antennas, a second combination unit which calculates an average signal-to-noise ratio (SNR) of each node based on the communication initiation signal and selects a node with a highest average SNR and performs communication using the selected node, and a selection unit which activates one of the first combination unit and the second combination unit and inactivates the other combination unit. When the quality of signals transmitted between wireless nodes deteriorates due to a poor channel environment, a node that can minimize the shadowing effect caused by an obstacle that blocks the path of transmission of signals is selected using space diversity. Therefore, it is possible to minimize link communication failures. In addition, it is possible to maximize communication capacity by achieving spatial multiplexing gain using an array antenna that is mounted on a node.

7 Claims, 5 Drawing Sheets

APPARATUS AND METHOD FOR SELECTING ANTENNAS AND NODES MIMO COMMUNICATION SYSTEM

CROSS-REFERENCE TO RELATED PATENT APPLICATION

This application claims the benefit of Korean Patent Application No. 10-2006-0096415, filed on Sep. 29, 2006, in the Korean Intellectual Property Office, the disclosure of which is incorporated herein in its entirety by reference.

BACKGROUND OF THE INVENTION

1. Field of the Invention

The present invention relates to an apparatus and method for selecting antennas and nodes so that communication capacity and the reliability of a link during communication between multiple-input multiple-output (MIMO) wireless nodes equipped with two or more antennas (i.e., an array antenna) can be maximized.

2. Description of the Related Art

Multi-input multi-output (MIMO) technology can achieve spatial multiplexing gain and can thus enhance the communication capacity during communication between nodes equipped with array antennas. However, such spatial multiplexing gain can result in high link failure rates due to the deteriorating quality of received signals caused by the shadowing effect. In a MIMO communication system, spatial multiplexing gain can be achieved when small-scale fading factors of antennas of a node are statistically uncorrelated. Accordingly, as the number of antennas provided to a transmission node or a reception node increases, communication capacity linearly increases. However, as the degree of correlation between small-scale fading factors increases, communication capacity decreases. In addition, when the shadowing effect is caused by an obstacle such as a building that blocks the path of reception of signals, spatial multiplexing gain cannot be obtained.

Therefore, it is necessary to develop techniques capable of addressing the problem caused by the shadowing effect, i.e., the problem of low signal reception sensitivity of MIMO nodes equipped with multiple antennas and achieving the advantage of MIMO technology regarding spatial multiplexing gain.

SUMMARY OF THE INVENTION

The present invention provides an apparatus and method for selecting antennas and nodes in a multi-input multi-output (MIMO) communication system in order to maximize spatial multiplexing gain, which is an advantage of MIMO communication, and to prevent received signal attenuation from occurring due to the channel fading phenomenon, which is caused by the existence of multiple paths, and the shadowing effect, which is caused by an obstacle such as a building that blocks the path of transmission of wireless signals. The apparatus and method can prevent the quality of received signals from deteriorating by establishing a macroscopic diversity communication topology using a number of nodes that can be used in a network. In addition, the apparatus and method can maximize communication capacity and enhance the reliability of a link by using MIMO technology with the use of an array antenna.

According to an aspect of the present invention, there is provided an apparatus for selecting antennas and nodes in a multi-input multi-output (MIMO) communication system. The apparatus includes a reception unit which detects a communication initiation signal from among a plurality of received signals, a first combination unit which calculates communication capacity based on the communication initiation signal, searches for a combination of transmission antennas that can maximize the communication capacity, and performs communication using the identified combination of transmission antennas, a second combination unit which selects a node with a highest average SNR using the communication initiation signal and performs communication using the selected node, and a selection unit which activates one of the first combination unit and the second combination unit and inactivates the other combination unit.

According to another aspect of the present invention, there is provided a method of selecting antennas and nodes in a MIMO communication system that comprises M nodes, each of the M nodes equipped with $N_T$ transmission antennas and $N_R$ reception antennas. The method includes (a) estimating a channel gain matrix based on a communication initiation signal, (b) selecting $N_T$ transmission antennas from among the $M \times N_T$ transmission antennas and calculating communication capacity using the channel gain matrix, and (c) performing (b) for each combination of antennas and estimating an optimum combination of antennas.

According to another aspect of the present invention, there is provided a method of selecting antennas and nodes in a MIMO communication system that comprises M nodes, each of the M nodes equipped with $N_T$ transmission antennas and $N_R$ reception antennas. The method includes (a) receiving a communication initiation signal, (b) calculating an average SNR of each of the M nodes based on the communication initiation signal, and (c) selecting a node with a highest average SNR from among the M nodes and initiating communication with the selected node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
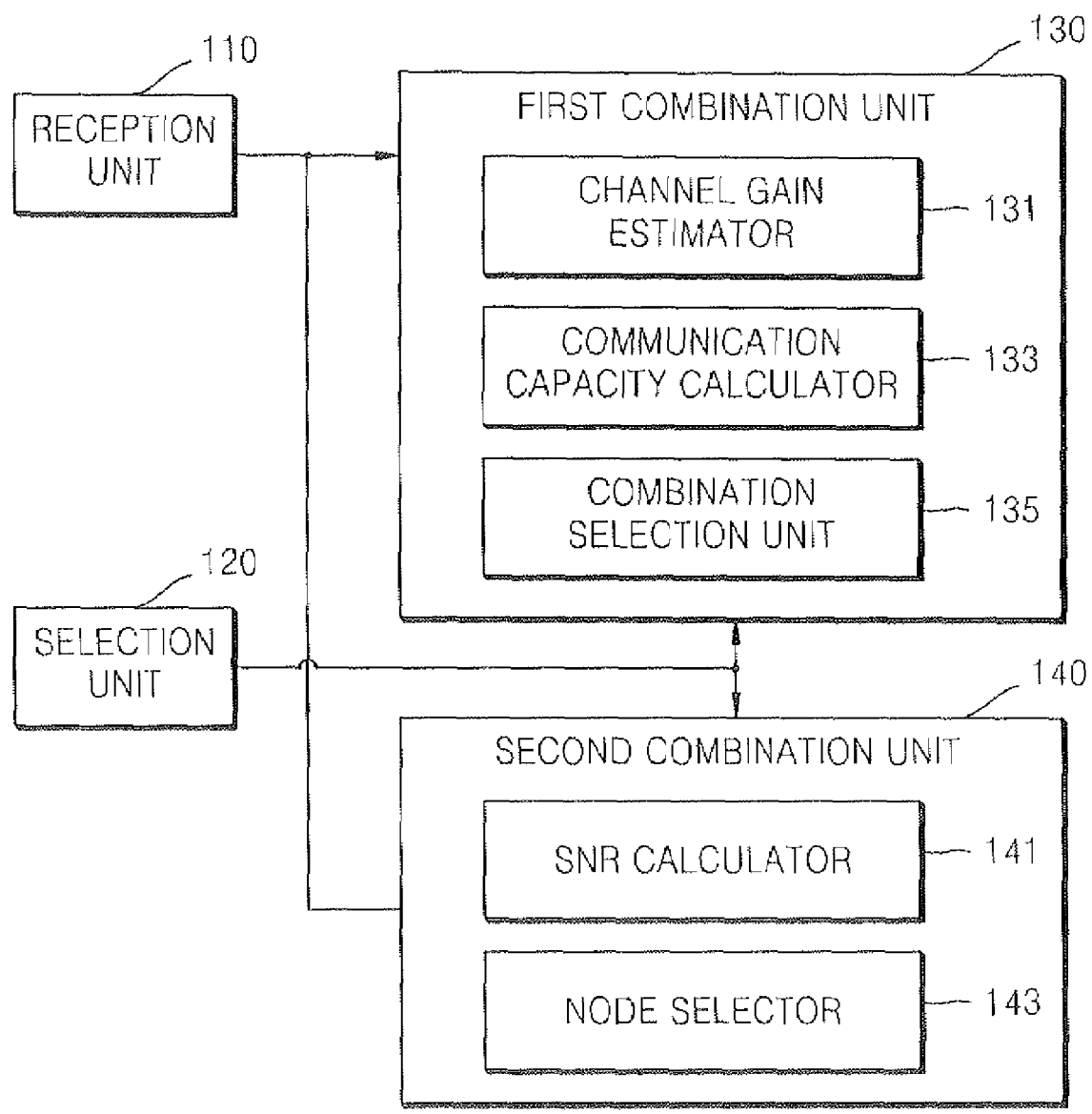
FIG. 1 is a block diagram of an apparatus for selecting antennas and nodes in a multi-input multi-output (MIMO) communication system, according to an embodiment of the present invention.
Figure 2:
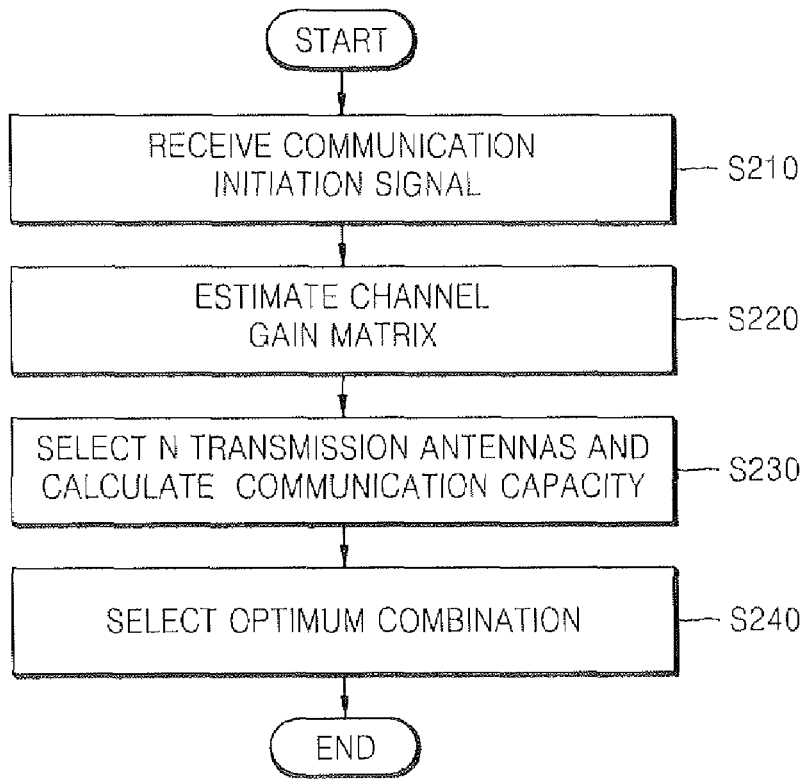
FIG. 2 is a flowchart illustrating a method of selecting antennas and nodes in a MIMO communication system, according to an embodiment of the present invention.
Figure 3:
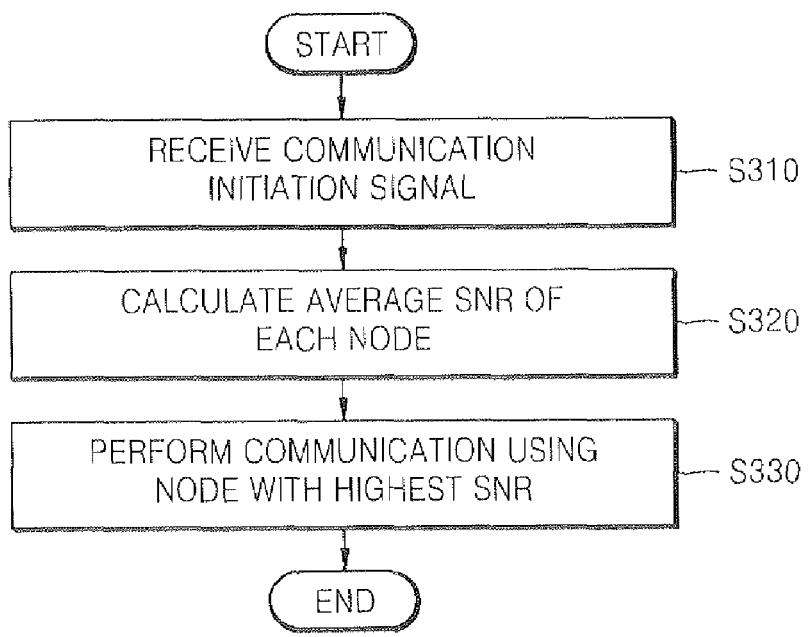
FIG. 3 is a flowchart illustrating a method of selecting antennas and nodes in a MIMO communication system, according to another embodiment of the present invention.
Figure 4:
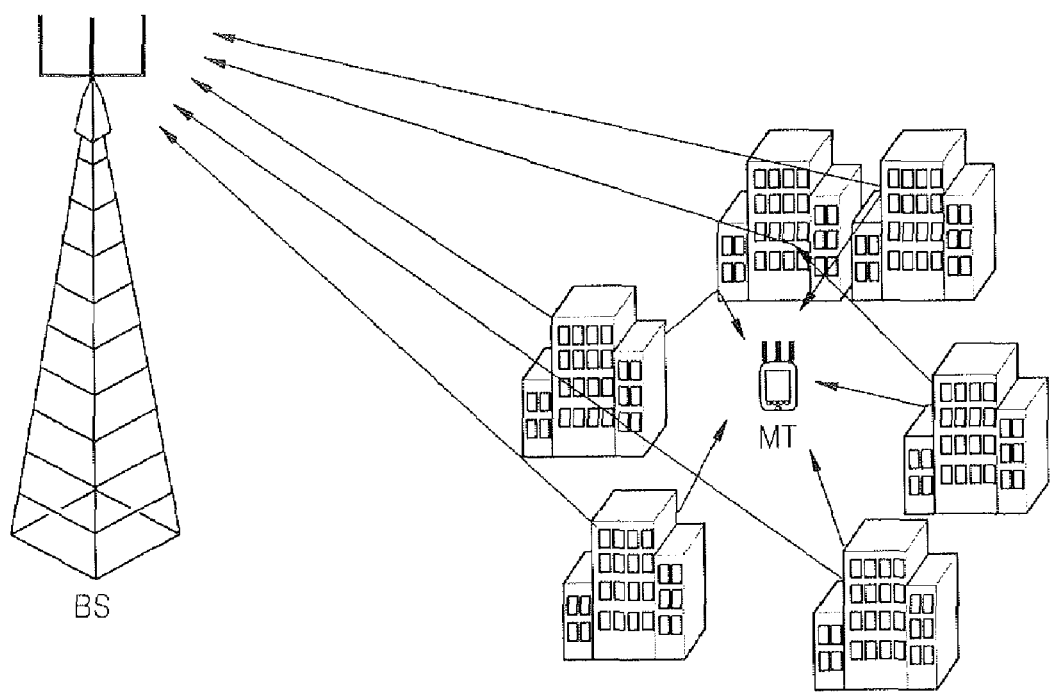
FIG. 4 is a schematic diagram illustrating a typical outdoor MIMO communication system equipped with an array antenna.
Figure 5:
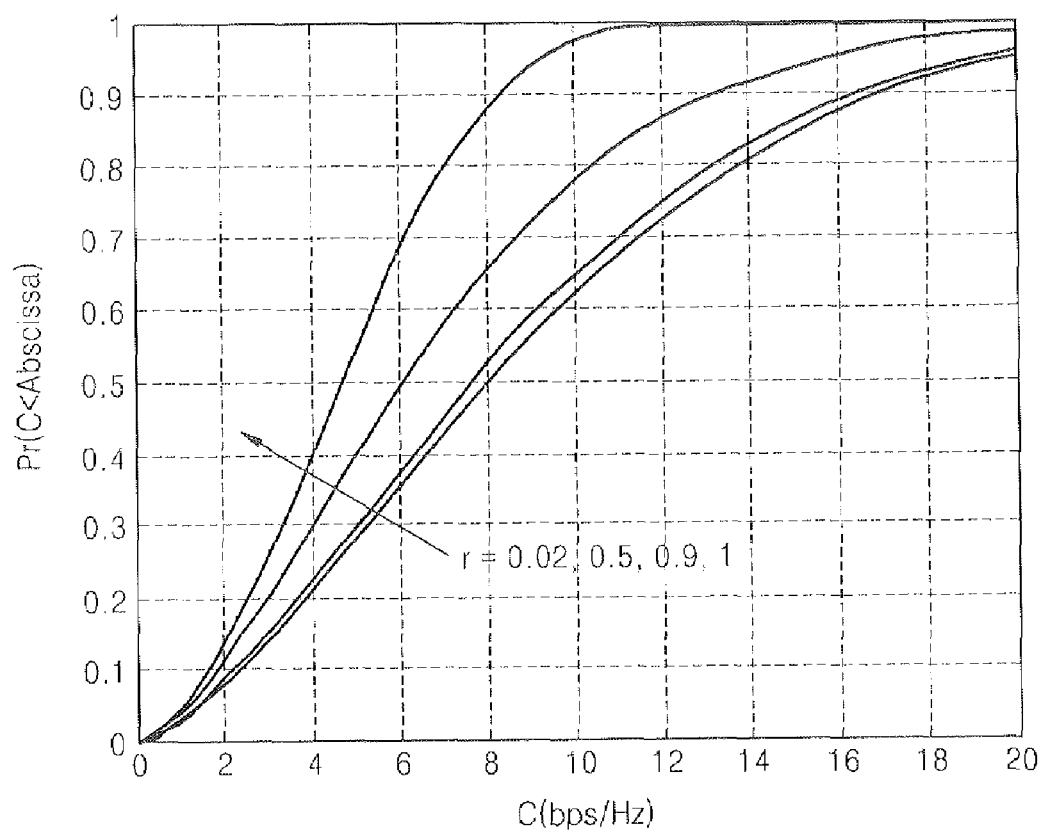
FIG. 5 is a diagram illustrating communication capacity outage performance curves of the MIMO communication system illustrated in FIG. 4.
Figure 6:
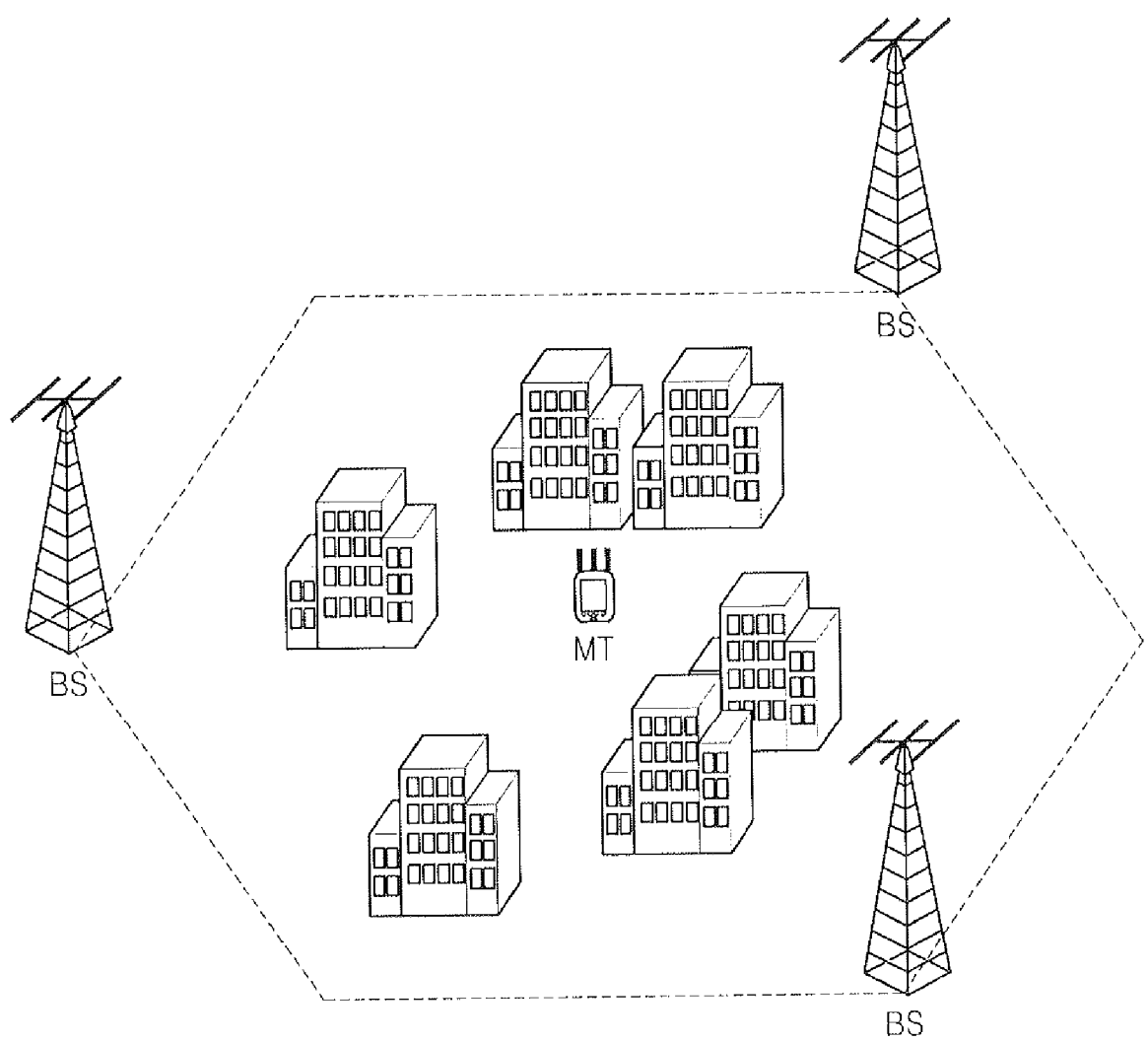
FIG. 6 is a schematic diagram illustrating a MIMO communication system having a macroscopic diversity topology.
Figure 7:
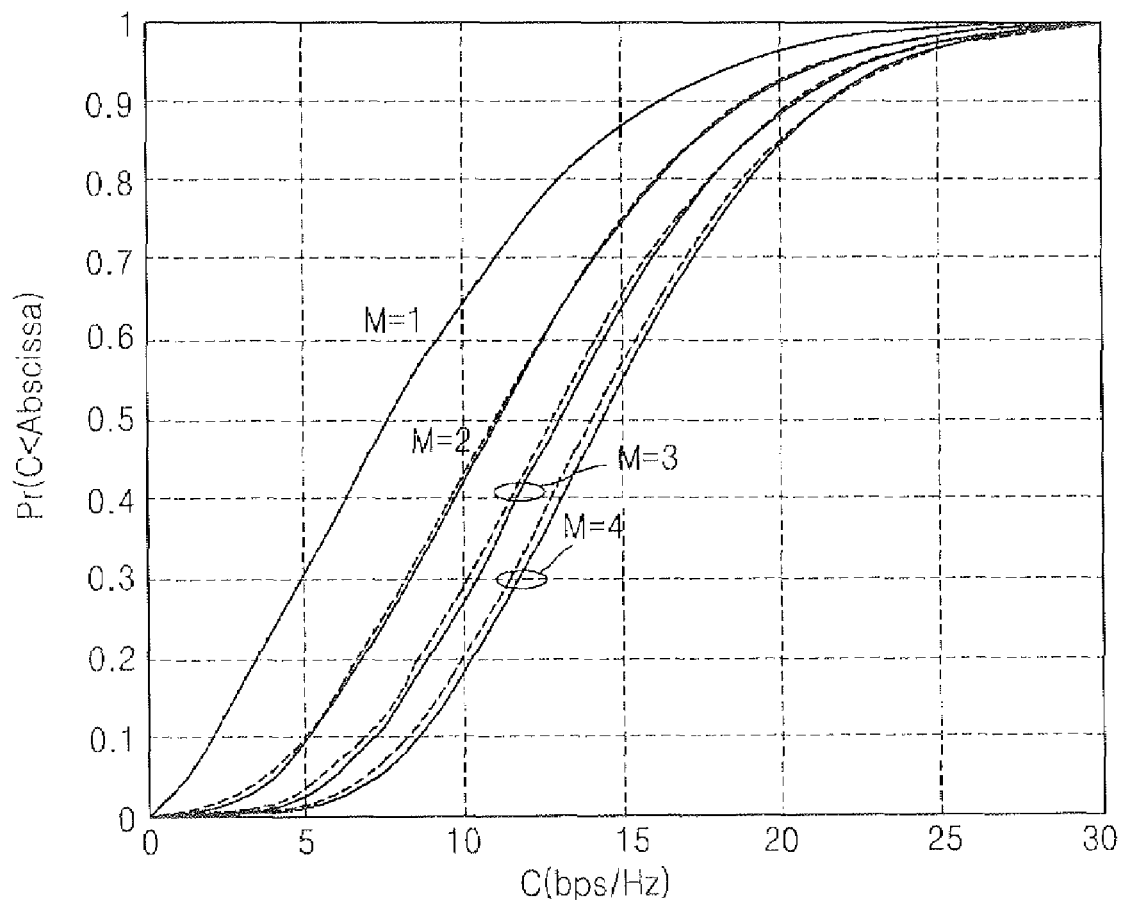
FIG. 7 is a diagram illustrating communication capacity outage performance curves obtained using the method according to the present invention.

FIG. 1 is a block diagram of an apparatus for selecting antennas in a multi-input multi-output (MIMO) communication system, according to an embodiment of the present invention, FIG. 2 is a flowchart illustrating a method of selecting antennas in a MIMO communication system, according to an embodiment of the present invention, FIG. 3 is a flowchart illustrating a method of selecting antennas in a MIMO communication system, according to another embodiment of the present invention, FIG. 4 is a schematic diagram illustrating a typical outdoor MIMO communication system equipped with an array antenna, FIG. 5 is a diagram illustrating communication capacity outage performance curves of the MIMO communication system illustrated in FIG. 4, FIG. 6 is a schematic diagram illustrating a MIMO communication system having a macroscopic diversity topology, and FIG. 7 is a diagram illustrating communication capacity outage performance curves obtained using the method according to the present invention. Referring to FIG. 5, r indicates the degree of statistical correlation between antennas. Referring to FIG. 7, solid lines correspond to communication capacity outage performance curves obtained using algorithm 1, and dotted lines correspond to communication capacity outage performance curves obtained using algorithm 2.

The background of and the need for the present invention will hereinafter be described in detail. FIG. 4 illustrates a MIMO communication node (hereinafter referred to as the ($N_T$, $N_R$) MIMO node) that uses $N_T$ transmission antennas and $N_R$ reception antennas. The communication capacity C of the ($N_T$, $N_R$) MIMO node is much larger than the communication capacity of a typical communication system using only one antenna. The communication capacity of the ($N_T$, $N_R$) MIMO node can be represented by Equation (1):

$$C = \log_2\left[\det\left(I + \frac{\rho}{N_T} H_C \cdot H_C^H\right)\right] \quad (1)$$

where $\rho$ indicates a signal-to-noise ratio (SNR), det(A) indicates a determinant of matrix A, $H_C$ indicates a channel gain matrix, $H^H$ indicates a Hermitian matrix, and I indicates a unit matrix. The SNR $\rho$ can be represented by the following equation:

$$\rho = \frac{P_T}{\sigma_N^2}$$

where $P_T$ indicates a transmitted signal and $\sigma_N^2$ indicates a noise power. The channel gain matrix $H_C$ can be represented by Equation (2):

$$H_C = \begin{bmatrix} h_{11}\omega_{11}^{1/2} & h_{12}\omega_{12}^{1/2} & \cdots & h_{1N_T}\omega_{1N_T}^{1/2} \\ h_{21}\omega_{21}^{1/2} & h_{22}\omega_{22}^{1/2} & \cdots & h_{2N_T}\omega_{2N_T}^{1/2} \\ \vdots & \vdots & \ddots & \vdots \\ h_{N_R 1}\omega_{N_R 1}^{1/2} & h_{N_R 2}\omega_{N_R 2}^{1/2} & \cdots & h_{N_R N_T}\omega_{N_R N_T}^{1/2} \end{bmatrix} \quad (2)$$

where $h_{ij}$ indicates a small-sale fading channel gain between a j-th transmission antenna and an i-th reception antenna, and $\omega_{ij}^{1/2}$ indicates a large-scale fading channel gain between the j-th transmission antenna and the i-th reception antenna.

FIG. 5 illustrates the communication capacity outage performance of a MIMO system in a composite fading channel environment in which the shadowing effect and the multi-path fading phenomenon are both taken into consideration. Referring to FIG. 5, communication capacity outage performance considerably deteriorates according to the probability distribution of a large-scale fading factor due to the shadowing effect, and this results from deterioration of the quality of received signals caused by an obstacle that exists on the path of transmission of signals.

In order to address this problem, i.e., in order to maximize communication capacity and the reliability of a link, a ($N_T$, $N_R$) MIMO communication system (hereinafter referred to as the (M, $N_T$, $N_R$) MIMO communication system) that has a macroscopic diversity topology comprising M nodes and is equipped with $N_T$ transmission nodes and $N_R$ reception nodes, as illustrated in FIG. 6, is considered. The complexity of a reception process of MIMO increases according to the number of antennas. Thus, according to the present invention, the number of transmission antennas and the number of reception antennas are respectively fixed to $N_T$ and $N_R$ regardless of the number of nodes. In this case, the number of transmission antennas that can actually be used is M×$N_T$. Of the M×$N_T$ transmission antennas, only $N_T$ transmission antennas are used in an actual communication operation. The communication capacity of the (M, $N_T$, $N_R$) MIMO communication system can be represented by Equation (1). According to the present invention, two algorithms for selecting $N_T$ transmission antennas from among the M×$N_T$ transmission antennas, i.e., algorithms 1 and 2, are suggested as a way to maximize the communication capacity of the (M, $N_T$, $N_R$) MIMO communication system. Algorithms 1 and 2 are as follows.

[Algorithm 1]

A transmission antenna that can maximize the communication capacity of the (M, $N_T$, $N_R$) MIMO communication system represented by Equation (1) is selected from among the M×$N_T$ transmission antennas regardless of the nodes of the (M, $N_T$, $N_R$) MIMO communication system, and then, MIMO communication is performed using the selected transmission antenna.

[Algorithm 2]

A node with a highest average SNR is selected from among the M nodes of the (M, $N_T$, $N_R$) MIMO communication system, and MIMO communication is performed using $N_T$ transmission antennas of the selected node.

The exemplary embodiments of algorithms 1 and 2 will hereinafter be described in detail with reference to FIGS. 1 through 3. Referring to FIGS. 1 through 3, in operation S210 or S310, a reception unit 110 detects from among signals received from a node (e.g., a base station) a communication initiation signal indicating that communication has begun. A first combination unit 130 executes algorithm 1. In other words, the first combination unit 130 calculates communication capacity based on the communication initiation signal, searches for a combination of transmission antennas that can maximize the communication capacity, and performs communication using the identified transmission antenna combination. A second communication unit 140 executes algorithm 2. In other words, the second communication unit 140 selects a node with a highest average SNR using the communication initiation signal, and performs communication using the selected node, A selection unit 120 selects one of the first and second communication units 130 and 140. Then, the selection unit 120 activates the selected communication unit, and inactivates the non-selected communication unit. A channel gain estimator 131 in the first communication unit 130 calculates a channel gain matrix based on the communication initiation signal, as indicated by Equation (2), in operation S220. A communication capacity calculator 133 in the first communication unit 130 is provided with the channel gain matrix, selects $N_T$ transmission antennas, and calculates communication capacity. Here, the $N_T$ transmission antennas may be selected by a single node or by different nodes. In other words, $N_T$ transmission antennas are arbitrarily selected from among $M \times N_T$ transmission antennas that can actually be used, and communication capacity corresponding to the selected $N_T$ transmission antennas is calculated using Equation (1). In this manner, a combination of $N_T$ transmission antennas that can guarantee best performance is estimated. As a result, an optimum combination of transmission antennas that can maximize communication capacity can be selected, and communication capacity is calculated as many times as $$\frac{(M \times N_T)!}{N_T! \times (M \times N_T - N_T)!}$$

in operation S230.

In operation S240, a combination calculator in the first communication unit 130 selects a combination of antennas that can maximize communication capacity according to the result of the calculation performed in operation S230.

The execution of algorithms 2 by the second combination unit 140 will hereinafter be described in detail with reference to FIG. 3. In operation S320, an SNR calculator 141 in the second combination unit 140 calculates an average SNR of each node based on the communication initiation signal received by the reception unit 110. An average SNR can be calculated using the following equation:

$$\rho = \frac{P_T}{\sigma_N^2}$$

where $P_T$ indicates a transmitted signal and $\sigma_N^2$ indicates a noise power. In operation S330, a node selector 143 in the second combination unit 140 selects a node with the highest average SNR by referencing the results of the calculation performed in operation S320.

In Algorithm 2, an average SNR of each node is calculated using a communication initiation signal, a node with a highest average SNR is selected, and MIMO communication is performed using the selected node. Thus, there is no need to calculate communication capacity using Equation (1). Therefore, algorithm 2 is less complicated than algorithms 1 to realize. Algorithms 1 and 2 are obtained based on the results of observing wireless channel environments. Referring to FIG. 5, the communication capacity of a MIMO system is affected more considerably by a reduction in signal reception sensitivity caused by the shadowing effect than by the degree of correlation between antennas. Therefore, it is expected that a node that is least influenced by the shadowing effect will provide highest communication capacity. FIG. 7 is a diagram for explaining the communication capacity outage performance of a MIMO system that uses algorithms 1 and 2. Referring to FIG. 7, the difference between the performance of algorithms 1 and the performance of algorithms 2 is inconsiderable. Therefore, algorithms 2 is considered superior to algorithms 1 in terms of performance and the ease of realization.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to maximize communication capacity in a network that is based on a MIMO communication technique and to enhance the reliability of a link using a macroscopic diversity topology. In addition, it is possible to reduce relay-caused delays by reducing the number of hops in a multi-hop network.

According to the present invention, when the quality of signals transmitted between wireless nodes deteriorates due to a poor channel environment, a node that can minimize the shadowing effect caused by an obstacle that blocks the path of transmission of signals is selected using space diversity. Therefore, it is possible to minimize link communication failures. In addition, it is possible to maximize communication capacity by achieving spatial multiplexing gain using an array antenna that is mounted on a node.

Moreover, reliability and communication capacity can both be enhanced by mounting an array antenna on a sink node and a gateway of a wireless sensor network and using the algorithms according to the present invention. As a result, it is possible to enhance fault tolerance of a network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for selecting antennas and nodes in a multi-input multi-output (MIMO) communication system, the apparatus comprising:
    a reception unit which detects a communication initiation signal from among a plurality of received signals;
    a first combination unit which calculates communication capacity based on the communication initiation signal, searches for a combination of transmission antennas that can maximize the communication capacity, and performs communication using the identified combination of transmission antennas;
    a second combination unit which selects a node with a highest average SNR using the communication initiation signal and performs communication using the selected node; and
    a selection unit which activates one of the first combination unit and the second combination unit and inactivates the other combination unit.

2. The apparatus of claim 1, wherein the first combination unit comprises:
    a channel gain estimator which calculates a channel gain matrix based on the communication initiation signal;
    a communication capacity calculator which calculates communication capacity for a predetermined number of antennas using the channel gain matrix; and
    a combination selector which makes a combination of antennas that maximizes the communication capacity.

3. The apparatus of claim 2, wherein the channel gain matrix is represented by the following equation:

$$H_C = \begin{bmatrix} h_{11}\omega_{11}^{1/2} & h_{12}\omega_{12}^{1/2} & \dots & h_{1N_I}\omega_{1N_T}^{1/2} \\ h_{21}\omega_{21}^{1/2} & h_{22}\omega_{22}^{1/2} & \dots & h_{2N_I}\omega_{2N_T}^{1/2} \\ \vdots & \vdots & \ddots & \vdots \\ h_{N_R1}\omega_{N_R1}^{1/2} & h_{N_R2}\omega_{N_R2}^{1/2} & \dots & h_{N_R N_T}\omega_{N_R N_T}^{1/2} \end{bmatrix}$$

where $H_C$ indicates the channel gain matrix, $h_{ij}$ indicates a small-sale fading channel gain between a j-th transmission antenna and an i-th reception antenna, and $\omega_{ij}^{1/2}$ indicates a large-scale fading channel gain between the j-th transmission antenna and the i-th reception antenna.

4. The apparatus of claim 2, wherein the communication capacity is calculated using the following equation:

$$C = \log_2\left[det\left(I + \frac{\rho}{N_T} H_C \cdot H_C^H\right)\right]$$

where $\rho$ indicates a signal-to-noise ratio (SNR) and is represented by the following equation:

$$\rho = \frac{P_T}{\sigma_N^2}$$

(where $P_T$ indicates a transmitted signal and $\sigma_N^2$ indicates a noise power), det(A) indicates a determinant of matrix A, $H_C$ indicates the channel gain matrix, $H^H$ indicates a Hermitian matrix, and I indicates a unit matrix.

5. The apparatus of claim 1, wherein the second combination unit comprises:
an SNR calculator which calculates an average SNR of each node based on the communication initiation signal; and
a node selector which selects a node with the highest average SNR.

6. A method of selecting antennas and nodes in a MIMO communication system that comprises M nodes, each of the M nodes equipped with N transmission antennas and $N_g$ reception antennsas, the method comprising:
(a) estimating a channel gain matrix based on a communication initiation signal;
(b) selecting $N_T$ transmission antennas from among the $MxN_T$ transmission antennas and calculating communication capacity using the channel gain matrix;
(c) performing (b) for each combination of antennas and estimating an optimum combination of antennas; and
wherein the channel gain matrix is represented by the following equation:

$$H_C = \begin{bmatrix} h_{11}\omega_{11}^{1/2} & h_{12}\omega_{12}^{1/2} & \dots & h_{1N_I}\omega_{1N_T}^{1/2} \\ h_{21}\omega_{21}^{1/2} & h_{22}\omega_{22}^{1/2} & \dots & h_{2N_I}\omega_{2N_T}^{1/2} \\ \vdots & \vdots & \ddots & \vdots \\ h_{N_R1}\omega_{N_R1}^{1/2} & h_{N_R2}\omega_{N_R2}^{1/2} & \dots & h_{N_R N_T}\omega_{N_R N_T}^{1/2} \end{bmatrix}$$

where $H_c$ indicates the channel gain matrix, $_y$ indicates a small-sale fading channel gain between a j-th transmission antenna and an i-th reception antenna, and $\omega_{ij}^{1/2}$ indicates a large-scale fading channel gain between the j-th transmission antenna and the i-th reception antenna.

7. A method of selecting antennas and nodes in a MIMO communication system that comprises M nodes, each of the M nodes equipped with $N_T$ transmission antennas and $N_g$ reception antennas, the method comprising:
(a) estimating a channel gain matrix based on a communication initiation signal;
(b) selecting $N_T$ transmission antennas from among the $MxN_T$ transmission antennas and calculating communication capacity using the channel gain matrix;
(c) performing (b) for each combination of antennas and estimating an optimum combination of antennas; and
wherein the communication capacity is calculated using the following equation:

$$C = \log_2\left[det\left(I + \frac{\rho}{N_T} H_C \cdot H_C^H\right)\right]$$

where $\rho$ indicates a signal-to-noise ratio (SNR) and is represented by the following equation:

$$\rho = \frac{P_T}{\sigma_N^2}$$

(where $P_T$ indicates a transmitted signal and $\sigma_N^2$ indicates a noise power), det(A) indicates a determinant of matrix A, $H_C$ indicates the channel gain matrix, $H^H$ indicates a Hermitian matrix, and I indicates a unit matrix.

* * * * *